C. W. GREENE.
PHOTOGRAPHIC FILM WINDING BOX.
APPLICATION FILED AUG. 11, 1914.
1,127,756.
Patented Feb. 9, 1915.
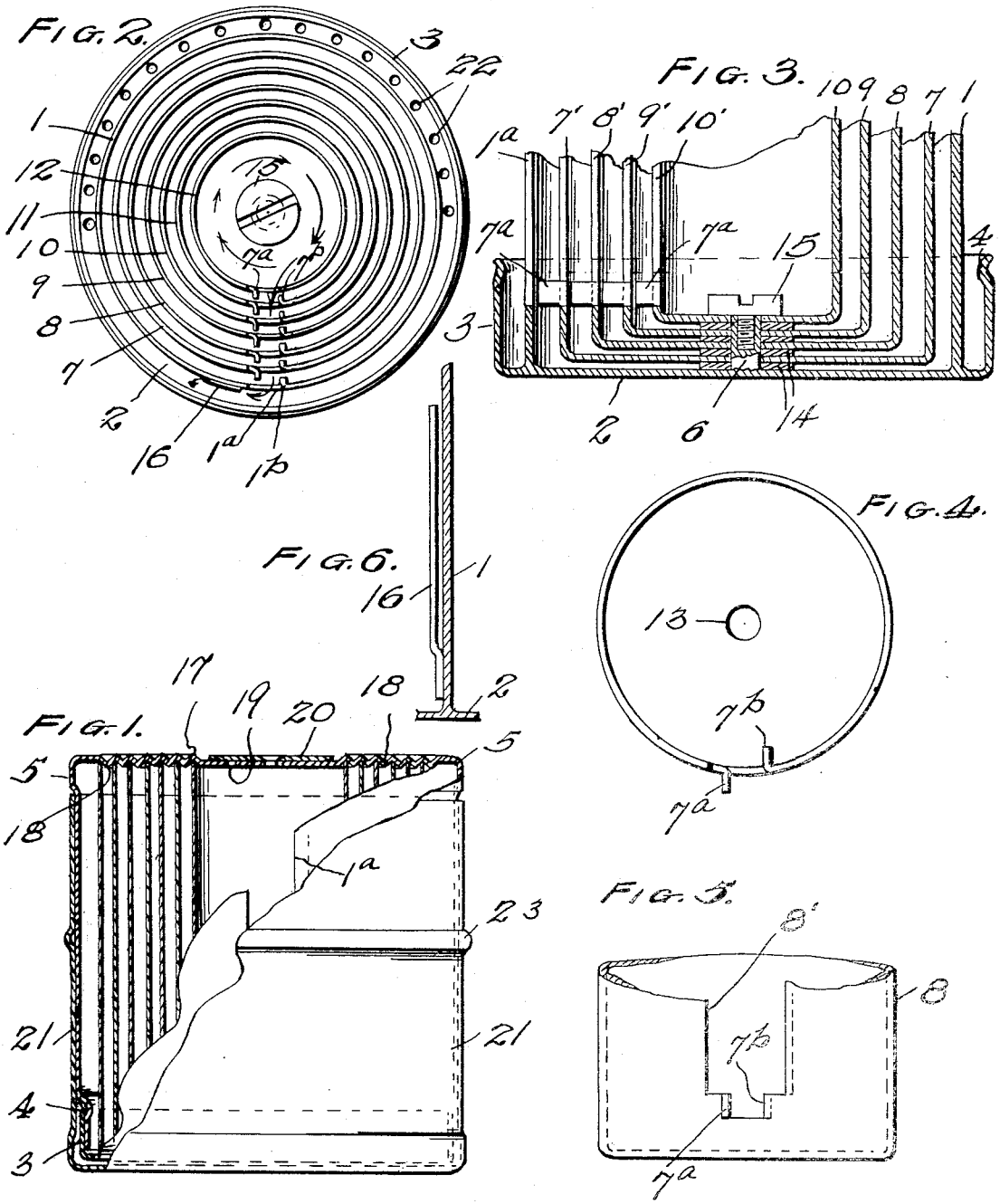
Witnesses.
C. K. Davis
M. L. Newcomb.
Inventor.
C. W. Greene
Herman A. Phillips
Attorney.

UNITED STATES PATENT OFFICE.

CHESTER W. GREENE, OF LYNN, MASSACHUSETTS, ASSIGNOR TO COMMONWEALTH ENGINEERING COMPANY, INC., OF LYNN, MASSACHUSETTS.

PHOTOGRAPHIC-FILM-WINDING BOX.

1,127,756.      Specification of Letters Patent.      Patented Feb. 9, 1915.

Application filed August 11, 1914. Serial No. 856,242.

*To all whom it may concern:*

Be it known that I, CHESTER W. GREENE, a citizen of the United States of America, residing at Lynn, in the county of Essex and State of Massachusetts, have invented certain new and useful Improvements in Photographic - Film - Winding Boxes, of which the following is a specification.

The present invention relates to improvements in photographic film winding boxes or fluid treating apparatus for the roll film type of photographs.

The primary object of the invention is the provision of a winding box in which roll films of photographs may be developed, and the invention is designed especially to facilitate the unwinding of a roll film from the camera spool, and the rewinding of the film in the box so that chemicals in the developing liquid in the box may act on all portions of the film uniformly, and so that the film may be properly developed.

The winding box which forms the subject matter of the present invention is especially adapted for facile handling, is neat, small in appearance, compact in arrangement, and may be quickly and easily manipulated, as will hereinafter be more fully pointed out.

The invention consists in certain novel combinations and arrangements of winding drums within a light proof and liquid proof receptacle, as will hereinafter appear.

In the accompanying drawings I have illustrated one complete example of the physical embodiment of my invention constructed according to the best mode I have so far devised for the practical application of the principles of the invention.

Figure 1 is a view in elevation, partly broken away, for convenience of illustration, showing the complete device. Fig. 2 is a plan view of the winding box *per se*, the cover and cap being removed. Fig. 3 is an enlarged vertical sectional view of the lower portion of the winding box showing the connections for the winding drums. Fig. 4 is a top plan view of one of the winding drums. Fig. 5 is an elevation of the lower end of the drum of Fig. 4. Fig. 6 is a view of a fragment of the fixed winding drum showing a retaining clip for the end of the photographic film paper.

In the preferred embodiment of the invention, the box is cylindrical in form, and comprises a drum 1 which has a bottom 2, while the upper end of the drum is open. At its lower end this drum 1, which is composed of suitable material, is formed with a ring or band 3 which projects upwardly from the bottom and has an inturned edge 4. This ring is preferably resilient, and is designed to retain the cover 5, as will be hereinafter pointed out.

The box 1 is formed with a centrally located boss 6 projecting upwardly from the bottom 2, and this boss is designed to form the pivot for a series of winding drums 7, 8, 9, 10, 11, and 12. In Fig. 3, only the winding drums 7, 8, 9, and 10 are shown for convenience of illustration, in order that the drums and their pivotal connection may be illustrated on an enlarged scale. In this figure, the box 1 and the winding drums are each shown as provided with slots as $1^a$, $7'$, $8'$, $9'$, and $10'$, and these slots extend from the open ends of the drums and box to near the bottom thereof. At the lower ends of these slots, all of the winding drums are provided with outwardly projecting integral lugs as $7^a$. The winding box and each of the winding drums with the exception of the innermost drum are all provided with inwardly projecting integral lugs $1^b$, $7^b$, and it will be understood that these two sets of lugs, the outwardly projecting lugs and the inwardly projecting lugs, are long enough to overlap each other and are adapted to engage each other as the winding drums are rotated, as will be described.

Each of the winding drums is centrally perforated as at 13, and by means of these perforations they are passed over the pivot boss 6, a washer 14 alternating with each drum, and by means of the retaining screw 15, all the winding drums are rotatably held upon the post or boss 6 so that the winding drums may be rotated independently of each other.

As indicated in Figs. 2 and 6, the winding box is provided with a retaining clip 16, which is preferably a resilient metal strip which is secured at its lower end to the wall of the winding drum, and extends upwardly parallel with the outer surface of the drum and a sufficient distance away from the wall to permit the passage of a photo film paper. This retaining clip is for the attachment of the other film paper before the spool is unwound within the winding box. The winding box is closed by means of a cylindrical cover 5, which, as clearly shown in Fig. 1, has its open edge inserted within the retaining ring 3 of the winding box. This cover is inverted as shown, and its upper or top portion 17 is provided with a series of concentric annular grooves 18 corresponding in number to the winding drums and the winding box.

In Fig. 1, it will be seen that the winding drums and box have their upper edges fitted into the corresponding grooves in the top 17 of the cover. This cover is provided with a vent opening 19 which is normally closed by a flat disk or valve 20, which is of resilient material, and this vent is provided in order to allow escape of air from the interior of the winding box before the developing process is started. An inverted cap or casing 21 incloses the cover, as shown in Fig. 1, and this cap and cover form with the box an air tight and light proof connection.

As shown in Fig. 2, the bottom of the winding box is provided with a series of holes or perforations 22 extending in a semicircle and located between the ring 3 and the wall 1 of the winding box.

In actual use of the device, all of the parts are assembled, the cap 21 is filled with the developer to the height of the groove 23, and then the cap is laid aside temporarily. The winding box is now ready for the spool or roll film, and the spool containing the photographic film with the covering paper is placed within the center drum. All of the slots in the winding drums are alined as in Fig. 2. The end of the winding paper is now pulled out with the fingers from the spool so that the spool is turned in a clockwise direction, as indicated by the arrows in Fig. 2. The winding paper is now passed through the alined slots of the winding drums and box, and its end is turned to the left and makes one turn around the outside of drum until the retaining clip 16, is reached, when it is doubled to the left beneath the clip. About an inch of the winding paper is turned over the retaining clip, and then the box with the inclosed spool is ready for the cover. The cover is now placed over the box, the concentric grooves frictionally engaging the edges of the open ends of the winding drums and box, as illustrated in Fig. 1. The box is grasped by one hand and, by the use of the other hand, the cover is now turned in a clockwise direction as far as it is possible to turn it. This action causes the film to wind upon the winding box, and then to wind successively upon each of the winding drums 9, 8, 7, etc. As the winding drums are successively rotated together the outwardly projecting lug of a drum is brought around until it contacts with the inwardly projecting lug of the next inner drum, and this contact of lugs locks the two parts together so that the winding drums are successively stopped by contact of an outer lug with an inner lug on the preceding winding drum until all the winding drums are locked, the film will have been unwound from the camera spool, and rewound upon the drums. The box with its cover thereon is now inserted within the cap 21, which it will be remembered has been partially filled with the developing fluid, and this fluid or liquid passes up through the openings 22, and the liquid is then uniformly distributed throughout the winding drums and the entire film is developed simultaneously.

Having thus fully described my invention, what I claim as new and desire to secure by Letters Patent, is:

1. The combination with a winding box and a series of concentrically arranged winding drums rotatably held therein, of a cover for said box engaging each of said winding drums, whereby the drums may be revolved.

2. The combination with a cylindrical winding box of a cover for said box, a ring on the box for retaining the cover, and a film winding device rotatably supported within the winding box.

3. The combination with a winding box having an outer retaining ring, of a cover for said box, and a series of revoluble winding drums supported within the box, and said cover having frictional engagement with said winding drums.

4. The combination in a winding box with a series of revolubly supported independently movable winding drums of a detachable cover for said box frictionally engaging said drums, whereby the latter may be revolved as described.

5. The combination with a cylindrical winding box, of a cover for said box, a resilient ring on the box having an inturned edge for retaining the cover, and a film winding device rotatably supported within the winding box.

6. The combination in a winding box with a plurality of revolubly supported independent winding drums, of a cover adapted to revolve said drums, and retaining means for the cover.

7. The combination in a winding box, of a plurality of successively arranged and independently movable revoluble winding drums, and a cover for the box having a corrugated top frictionally engaging said drums to revolve the same.

8. The combination with a revoluble winding device consisting of a plurality of rotatable drums, of a revoluble box having a drum inclosing said rotatable drums, and means whereby said drums may be connected successively for rotation one within the other.

9. The combination in a winding box, of a series of concentrically arranged rotatable and slotted drums, the innermost drum being adapted to receive a roll film, and means on the winding box for attaching the end of the film, and means whereby said drums may be connected and successively rotated one within the other.

In testimony whereof I affix my signature in presence of two witnesses.

CHESTER W. GREENE.

Witnesses:
EARL ABRAMS,
WM. W. DICKEY.